(12) United States Patent
Patil et al.

(10) Patent No.: US 10,100,244 B2
(45) Date of Patent: Oct. 16, 2018

(54) ACCELERATED SWELLING OF OIL-SWELLABLE ELASTOMERS IN A WELL

(71) Applicant: HALLIBURTON ENERGY SERVICES, INC., Houston, TX (US)

(72) Inventors: Prajakta Ratnakar Patil, Pune (IN); Snehalata Sachin Agashe, Pune (IN); Anjali Ramesh Sarda, Pune (IN); Prasanta Das, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 333 days.

(21) Appl. No.: 14/771,065

(22) PCT Filed: Mar. 29, 2013

(86) PCT No.: PCT/US2013/034659
§ 371 (c)(1),
(2) Date: Aug. 27, 2015

(87) PCT Pub. No.: WO2014/158192
PCT Pub. Date: Oct. 2, 2014

(65) Prior Publication Data
US 2016/0040058 A1 Feb. 11, 2016

(51) Int. Cl.
*C09K 8/64* (2006.01)
*E21B 23/06* (2006.01)
(Continued)

(52) U.S. Cl.
CPC .............. *C09K 8/64* (2013.01); *C09K 8/502* (2013.01); *C09K 8/565* (2013.01); *E21B 23/06* (2013.01);
(Continued)

(58) Field of Classification Search
CPC . C09K 8/64; C09K 8/50; C09K 8/502; C09K 8/56; C09K 8/565; E21B 23/06
See application file for complete search history.

(56) References Cited

U.S. PATENT DOCUMENTS

| 6,518,224 B2 * | 2/2003 | Wood | C09K 8/035 |
| | | | 175/72 |
| 7,341,106 B2 * | 3/2008 | Reddy | C09K 8/44 |
| | | | 166/277 |

(Continued)

FOREIGN PATENT DOCUMENTS

| EP | 2511359 A1 | 10/2012 |
| WO | WO 01/53429 | 7/2001 |

(Continued)

OTHER PUBLICATIONS

International Search Report and Written Opinion received in Patent Cooperation Treaty Application No. PCT/US2013/034659, dated Nov. 26, 2013, 9 pages.

(Continued)

*Primary Examiner* — Zakiya W Bates
*Assistant Examiner* — Crystal J Miller
(74) *Attorney, Agent, or Firm* — Haynes and Boone, LLP

(57) ABSTRACT

A method of swelling an oil-swellable elastomer in a well comprising the step of: contacting the oil-swellable elastomer in the well with a treatment fluid, wherein the treatment fluid comprises: (A) an oil selected from the group consisting of alkanes and naphtha, wherein the oil comprises hydrocarbons having anywhere in the range of 5 to 21 carbons; (B) an α-olefin having anywhere in the range of 18 to 26 carbons; and (C) an activator for oil-swelling, the activator selected from the group consisting of: ketones, dodecane, terpenes, terpenoids, haloalkanes having from 9

(Continued)

to 20 carbons, and any combination thereof. An oil-swelled elastomer as produced by the method is also contemplated.

13 Claims, 8 Drawing Sheets

(51) Int. Cl.
*C09K 8/502* (2006.01)
*C09K 8/565* (2006.01)
*E21B 33/12* (2006.01)
*E21B 43/16* (2006.01)

(52) U.S. Cl.
CPC .......... *E21B 33/12* (2013.01); *E21B 33/1208* (2013.01); *E21B 43/16* (2013.01)

(56) References Cited

U.S. PATENT DOCUMENTS

| | | | |
|---|---|---|---|
| 7,866,408 | B2 | 1/2011 | Allison et al. |
| 8,100,190 | B2 | 1/2012 | Weaver et al. |
| 2007/0017676 | A1* | 1/2007 | Reddy .................... C09K 8/502 166/295 |
| 2007/0149412 | A1 | 6/2007 | Leggett et al. |
| 2010/0292109 | A1* | 11/2010 | Moradi-Araghi ...... C09K 8/887 507/224 |
| 2011/0065613 | A1 | 3/2011 | Leggett et al. |
| 2011/0160103 | A1 | 6/2011 | van Zanten et al. |

FOREIGN PATENT DOCUMENTS

| | | |
|---|---|---|
| WO | WO 2010/125144 A1 | 11/2010 |
| WO | WO 2012/097071 A2 | 7/2012 |

OTHER PUBLICATIONS

Al-Yami et al., "Lab Investigation of Oil Swelling Elastomers for Smart Well Completions," SPE 2008 Offshore Technology Conference, May 5-8, 2008, pp. 1-9, Society of Petroleum Engineers, Houston, Texas, U.S.

Al-Yami et al., "Swelling Packers; Lab Testing and Field Application," International Petroleum Technology Conference, Dec. 3-5, 2008, pp. 1-17, Society of Petroleum Engineers, Kuala Lumpur, Malaysia.

* cited by examiner

ACCELERATED SWELLING OF OIL-SWELLABLE ELASTOMERS IN A WELL

CROSS REFERENCE TO RELATED APPLICATIONS

The present application is a U.S. National Stage patent application of International Patent Application No. PCT/US2013/034659, filed on Mar. 29, 2013, the disclosure of which is incorporated herein by reference in its entirety.

TECHNICAL FIELD

The inventions are in the field of producing crude oil or natural gas from subterranean formations. More specifically, the inventions generally relate to methods of swelling an oil-swellable elastomer in a well. Applications include oil-swellable downhole tools, such as swellable packers.

BACKGROUND

Oil-swellable elastomers have various applications in wells, especially wells used for producing hydrocarbons. For example, an oil-swellable elastomer can be used in downhole tools having swellable components, such as swellable packers. For another example, oil-swellable elastomers can be used as particulate in various hydraulic fracturing operations as part of a proppant matrix. In yet another example, an oil-swellable particulate can be used as a particulate in a gravel pack.

An oil-swellable elastomer swells when exposed to a fluid comprising a hydrocarbon. The elastomer swells as a hydrocarbon enters and is trapped in the elastomer matrix due to the natural affinity of the polymer molecules of the elastomer and the hydrocarbon. Oil is absorbed into the oil-swellable elastomer through diffusion. Through the random thermal motion of the atoms that are in the liquid hydrocarbons, oil diffuses into the elastomer. As hydrocarbon molecules are absorbed into the polymer matrix of the elastomer, it causes the elastomer to stretch and expand. Swelling of the elastomer in the presence of oil is irreversible (whereas water-swelling elastomer, which operates on osmosis phenomenon, is reversible process). The swelling continues until the internal stresses inside the elastomer reach equilibrium. That is, the swell pressure increases until diffusion can no longer occur.

Although the hydrocarbon of the fluids used for this purpose should not degrade the elastomer, they will alter its mechanical properties, such as hardness and tensile strength, depending on the volume increase.

An application of oil-swellable elastomers is in oil-swellable downhole tools such as swell screens used for sand control.

Sand control is an operation to reduce production of formation sand or other fines from a poorly consolidated subterranean formation. In this context, "fines" are tiny particles, typically having a diameter of 43 microns or smaller, that have a tendency to flow through the formation with the production of hydrocarbon fluids. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the sand and fines are highly abrasive and can be damaging to pumping and oilfield other equipment and operations.

Placing a relatively larger particulate near the wellbore can help filter out the sand or fine particles and prevents them from flowing into the well with the produced fluids. The primary objective is to stabilize the formation while causing minimal impairment to well productivity. The particulate used for this purpose is referred to as "gravel." In the oil and gas field, and as used herein, the term "gravel" is refers to relatively large particles ranging in diameter from about 0.1 mm up to about 2 mm. Generally, a particulate having the properties, including chemical stability, of a low-strength proppant is used in gravel packing. An example of a commonly used gravel packing material is sand having an appropriately large particulate size range.

In general, a mechanical screen is placed in the wellbore and the surrounding annulus is packed with a particulate of a larger specific size designed to prevent the passage of formation sand or other fines.

An example of such a mechanical swell screen is PETROGUARD™ Swell screens, which are commercially available from Halliburton Energy Services. PETROGUARD™ swell screens provide an alternative to traditional expandable sand-control techniques. The design combines Halliburton's SWELL TECHNOLOGY™ systems with bonded mesh filtration media provide a self-expanding screen which delivers the benefits associated with traditional expandable solutions, but with greatly reduced risk. The PETROGUARD™ swell screens utilize a base pipe with a sheath of an oil-swellable elastomer.

When the elastomer is formed into the form of a sheath around a piece of pipe or other tubular, the result of the swelling is an increase of the outside diameter of the oil-swellable elastomer on the tubular. The oil-swellable elastomer is developed by contact with oil in order to swell and seal between casing strings or pipe and open hole. Swelling of the packer is consistent along its length. Oil continues to diffuse into the elastomer causing the packing element to swell until it reaches the inside diameter of the open borehole. At this point a differentially sealing annular barrier can be created.

Operationally, the benefit of a swellable packer is simplicity. There are no moving parts required to work, through pipe manipulation or by applied hydraulic pressure. No special service personnel are needed. The packers are simply run to depth, similar to a casing, and allowed to swell before production or injection operations begin.

Previous solutions to swell oil-swelleable elastomer has taken more than 5 days for 90% of complete swelling and there is no solution available where 90% of complete swelling can take place in less than 5 days.

SUMMARY OF THE INVENTION

A purpose of this invention is to disclose a treatment fluid composition and method for accelerated swelling of an oil-swellable elastomer.

A method of swelling an oil-swellable elastomer in a well is provided, the method comprising the step of: contacting the oil-swellable elastomer in the well with a treatment fluid, wherein the treatment fluid comprises:

(A) an oil selected from the group consisting of alkanes and naphtha, wherein the oil comprises hydrocarbons having anywhere in the range of 5 to 21 carbons;

(B) an α-olefin having anywhere in the range of 18 to 26 carbons; and (C) an activator for oil-swelling, the activator selected from the group consisting of: ketones, dodecane, terpenes, terpenoids, haloalkanes having from 9 to 20 carbons, and any combination thereof.

A composition comprising an oil-swellable elastomer is provided, wherein the elastomer has absorbed therein:

(A) an oil selected from the group consisting of alkanes and naphtha, wherein the oil comprises hydrocarbons having anywhere in the range of 5 to 21 carbons;

(B) an α-olefin having anywhere in the range of 18 to 26 carbons; and (C) an activator for oil-swelling, the activator selected from the group consisting of: ketones, dodecane, terpenes, terpenoids, haloalkanes having from 9 to 20 carbons, and any combination thereof.

In addition, a well comprising an oil-swellable elastomer positioned in the well is provided, wherein the elastomer has absorbed therein:

(A) an oil selected from the group consisting of alkanes and naphtha, wherein the oil comprises hydrocarbons having anywhere in the range of 5 to 21 carbons;

(B) an α-olefin having anywhere in the range of 18 to 26 carbons; and (C) an activator for oil-swelling, the activator selected from the group consisting of: ketones, dodecane, terpenes, terpenoids, haloalkanes having from 9 to 20 carbons, and any combination thereof.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

DETAILED DESCRIPTION OF PRESENTLY PREFERRED EMBODIMENTS AND BEST MODE

Definitions and Usages

General Interpretation

Figure 1:
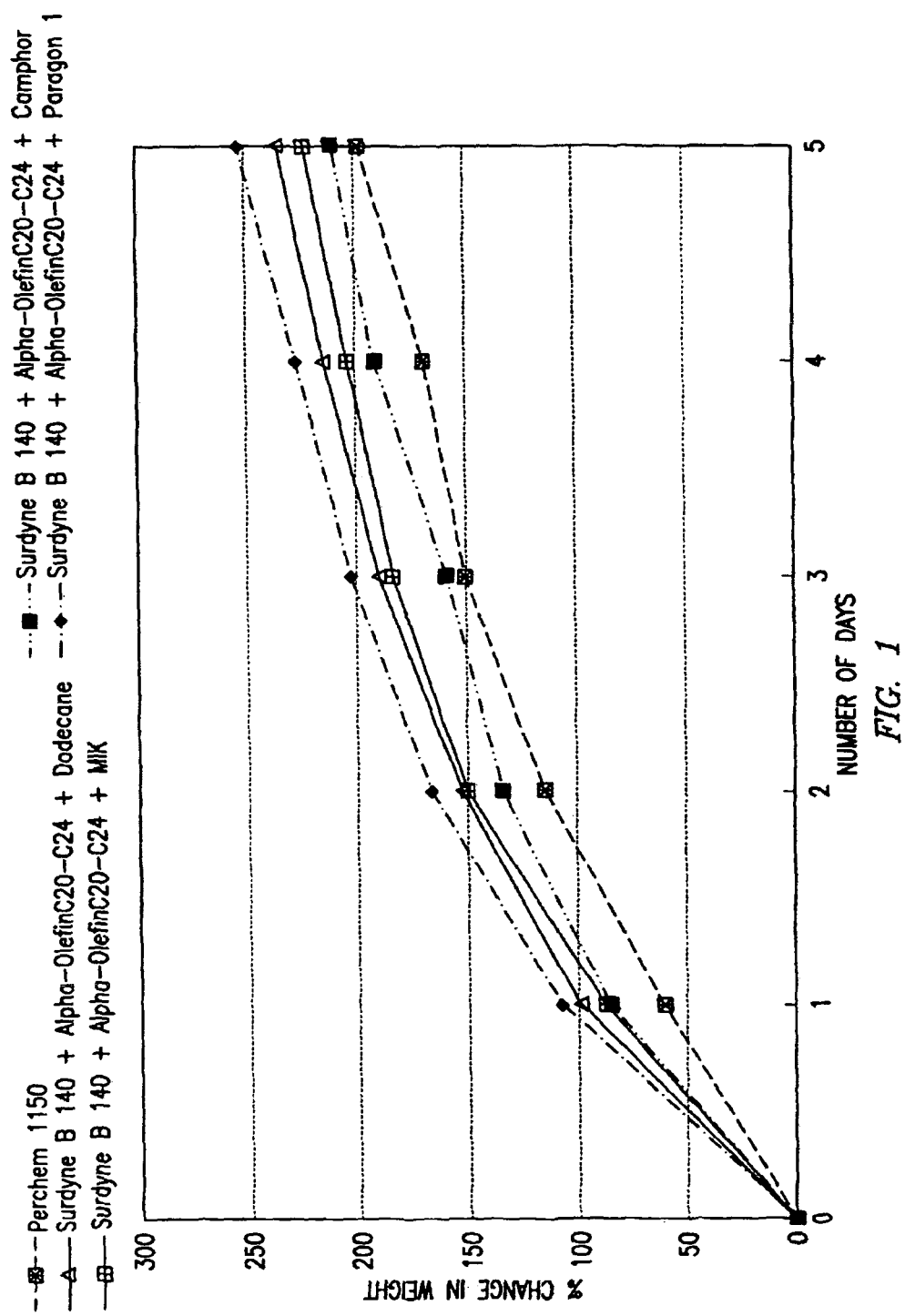
FIG. 1 is a graph showing the change in weight of elastomer over time at 150° F. using blends of SURDYNE B-140™ kerosene, alpha-olefins C18-26, and examples of different types of activators compared to PERCHEM 1150™ petroleum distillate alone.
Figure 2:
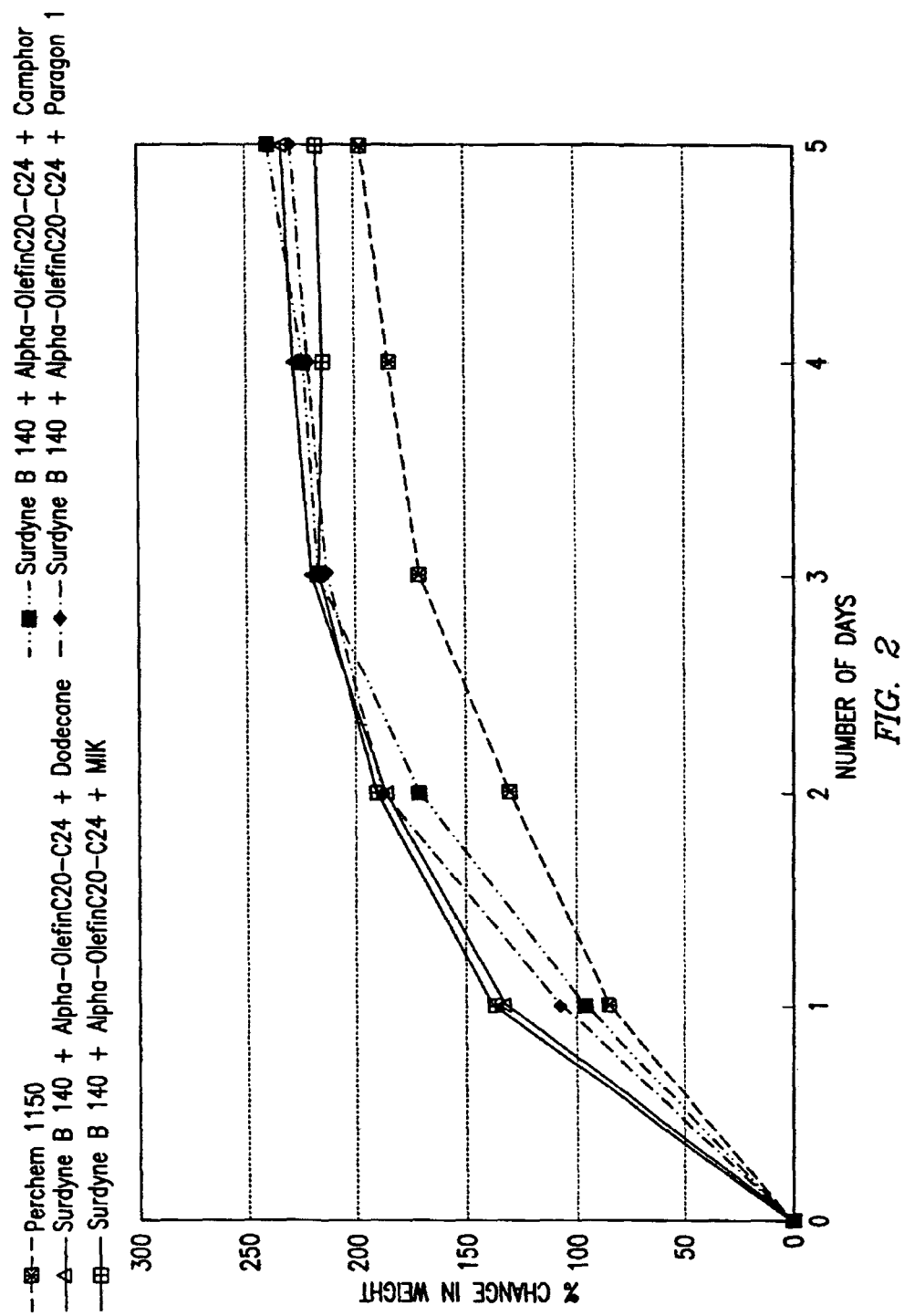
FIG. 2 is a graph showing the change in weight of elastomer over time at 200° F. using blends of SURDYNE B-140™ kerosene, alpha-olefins C18-26, and examples of different types of activators compared to PERCHEM 1150™ petroleum distillate alone.
Figure 3:
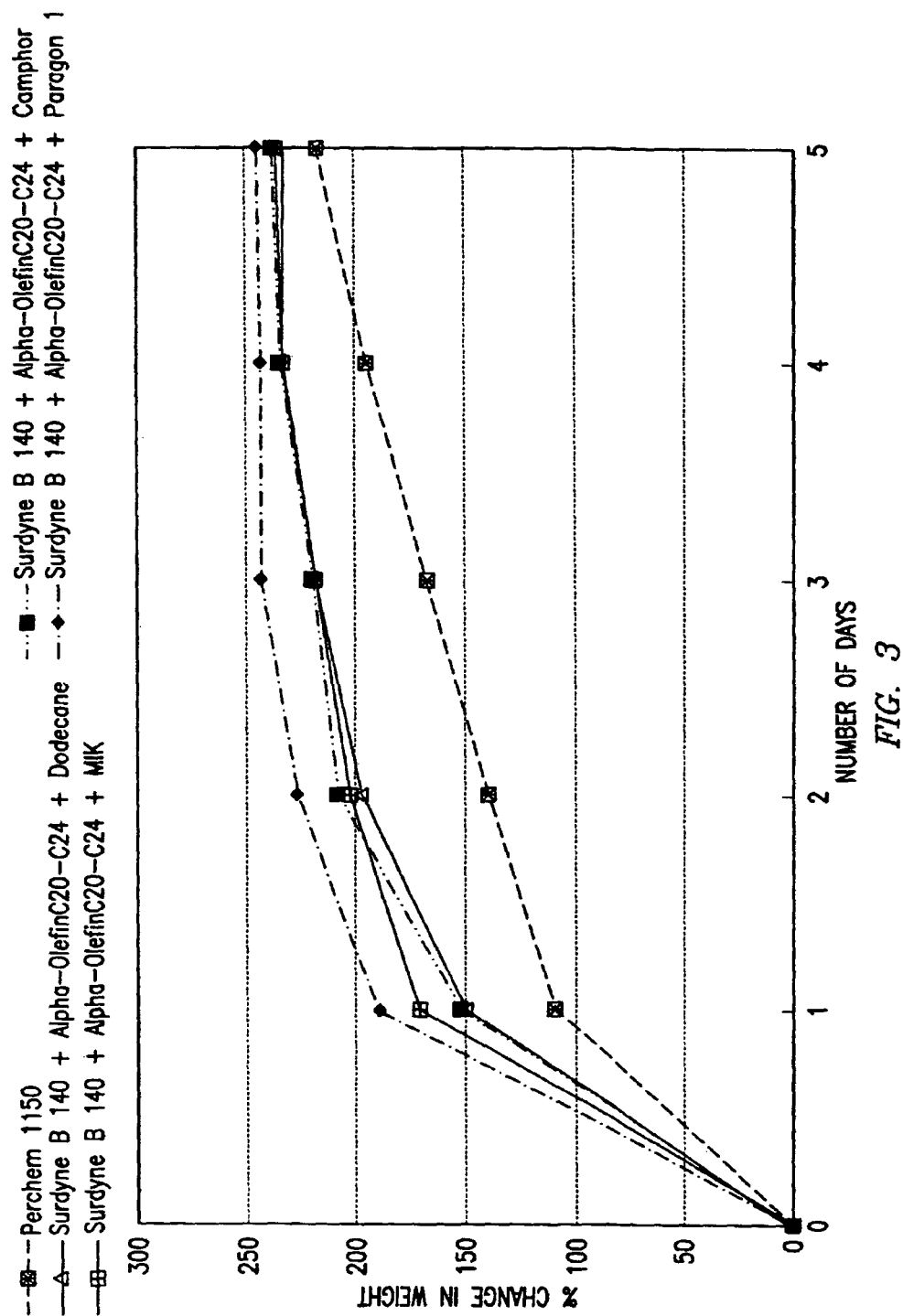
FIG. 3 is a graph showing the change in weight of elastomer over time at 250° F. using blends of SURDYNE B-140™ kerosene, alpha-olefins C18-26, and examples of different types of activators compared to PERCHEM 1150™ petroleum distillate alone.
Figure 4:
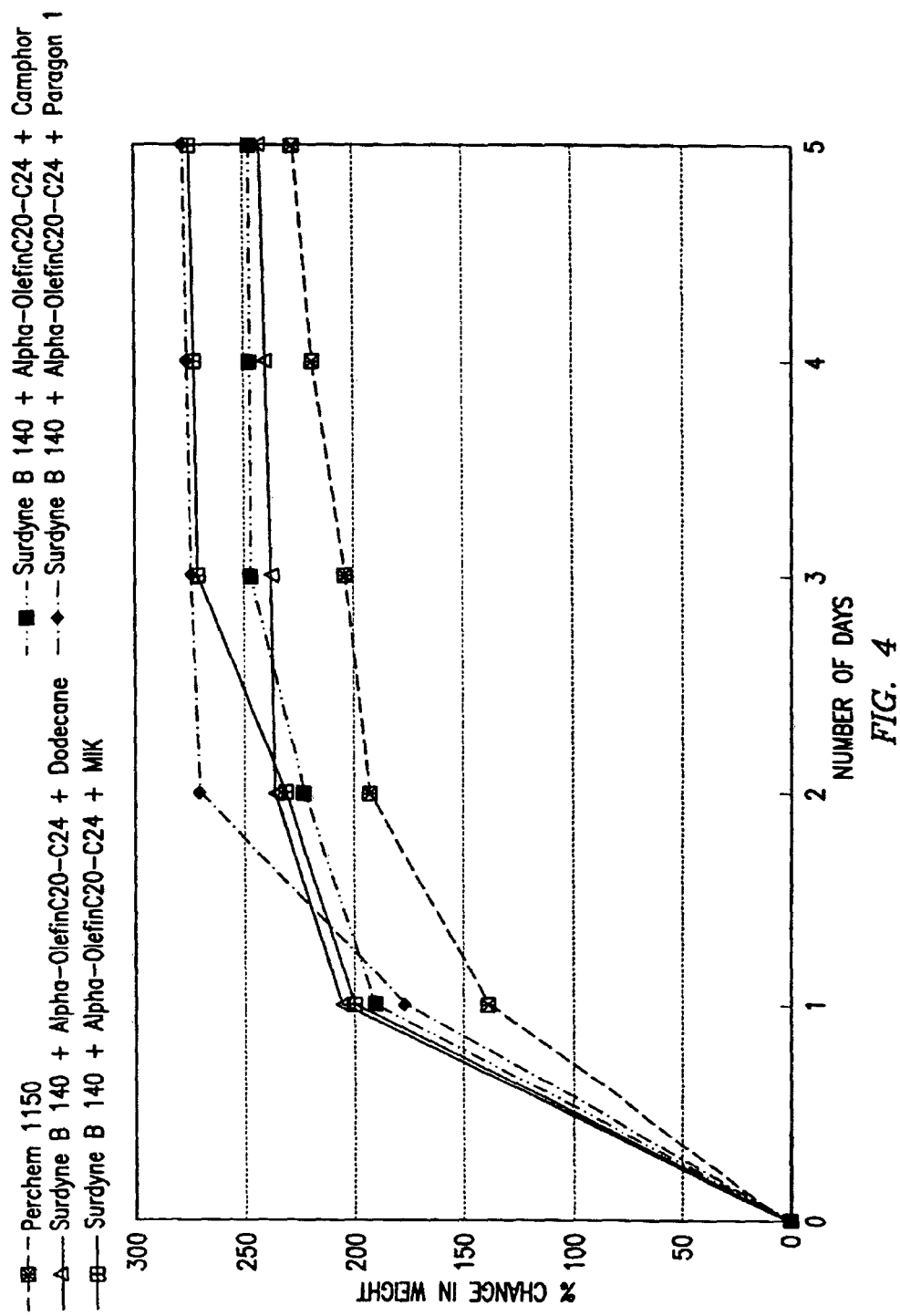
FIG. 4 is a graph showing the change in weight of elastomer over time at 300° F. using blends of SURDYNE B-140™ kerosene, alpha-olefins C18-26, and examples of different types of activators compared to PERCHEM 1150™ petroleum distillate alone.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

Oil and gas are composed of one or more hydrocarbons. A hydrocarbon is a compound having at least hydrogen and carbon. The molecular structure of hydrocarbon compounds can range from being as simple as methane ($CH_4$) to a large, highly complex compound. Petroleum is a complex mixture of hydrocarbons.

A "subterranean formation" is a body of rock that has sufficiently distinctive characteristics and is sufficiently continuous for geologists to describe, map, and name it. In the context of formation evaluation, a subterranean formation refers to the volume of rock seen by a measurement made through a wellbore, as in a log or a well test. These measurements indicate the physical properties of this volume of rock, such as the property of permeability.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Reservoirs can be of well consolidated or poorly consolidated.

Well Servicing and Treatment fluids

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

For example, stimulation is a type of treatment performed to enhance or restore the productivity of oil or gas from a well. Other types of completion or intervention treatments can include, for example, sand control, including gravel packing with mechanical screens. Even small improvements in fluid flow can yield dramatic production results.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or treatment fluids can be directed from the wellhead into any desired portion of the wellbore.

As used herein, the word "tubular" means any kind of structural body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location. Tubulars can be of any suitable body material, but in the oilfield they are most commonly of steel.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "treatment fluid" broadly refers to any fluid adapted to be introduced into a well for any purpose. A treatment fluid can be, for example, a drilling fluid, a setting composition, a treatment fluid, or a spacer fluid. If a treatment fluid is to be used in a relatively small volume, for example less than about 200 barrels (about 8,400 US gallons or about 32 m$^3$), it is sometimes referred to as a wash, dump, slug, or pill.

A "portion" of a well, tubular, or pipeline refers to any downhole portion of the well or any portion of the length of a pipeline or any portion of a tubular, as the case may be.

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical. Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the treatment fluid on the BHST during treatment. The design temperature for a treatment fluid is sometimes referred to as the bottom hole circulation temperature ("BHCT"). Because treatment fluids may be considerably cooler than BHST, the difference between the two temperatures can be quite large. Ultimately, if left undisturbed, a subterranean formation will return to the BHST.

As used herein, a "non-aqueous" liquid phase means a liquid phase that comprises less than 5% by weight water.

Substances, Chemicals, and Polymers

A substance can be a pure chemical or a mixture of two or more different chemicals.

As used herein, a "polymer" or "polymeric material" includes polymers, copolymers, terpolymers, etc. In addition, the term "copolymer" as used herein is not limited to the combination of polymers having only two monomeric units, but includes any combination of monomeric units, e.g., terpolymers, tetrapolymers, etc.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Every fluid inherently has at least a continuous phase. A fluid can have more than one phase. The continuous phase of a treatment fluid is a liquid under Standard Laboratory Conditions. For example, a treatment fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

In the context of a treatment fluid, oil is understood to refer to an oil liquid, whereas gas is understood to refer to a physical state of a substance, in contrast to a liquid. In this context, an oil is any substance that is liquid under Standard Laboratory Conditions, is hydrophobic, and soluble in organic solvents. Oils have a high carbon and hydrogen content and are non-polar substances. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the strain rate in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most treatment fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Like other physical properties, the viscosity of a Newtonian fluid or the apparent viscosity of a non-Newtonian fluid may be highly dependent on the physical conditions, primarily temperature and pressure.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or 50 viscometer or a CHANDLER™ 5550 HPHT viscometer. Such a viscometer measures viscosity as a function of time, temperature, and shear rate. The viscosity-measuring instrument can be calibrated using standard viscosity silicone oils or other standard viscosity fluids.

Unless otherwise specified, the apparent viscosity of a fluid (excluding any suspended solid particulate larger than silt) is measured with a ANTON PAAR™ viscometer using CC-27 cup, B1 bob, at a shear rate of 100 1/s, and at a temperature of 68° F. (20° C.) to 140° F. and a pressure of 1 atmosphere.

A substance is considered to be a fluid if it has an apparent viscosity less than 5,000 mPa·s (5,000 cP) (independent of any gel characteristic). For reference, the viscosity of pure water is about 1 mPa·s (1 cP).

General Approach

A purpose of this invention is to disclose a treatment fluid composition and method for accelerated swelling of an oil-swellable elastomer. Preferably, a treatment fluid composition and method can provide accelerated swelling of an oil-swellable elastomer in less than 21 days, more preferably in less than 14 days, still more preferably in less than 7 days, and most preferably in less than 5 days. For example, the invention discloses various oil-based formulations that accelerate the swelling of an oil-swellable elastomer in about 3 to about 5 days.

The amount of swelling is dependent on the chemistry of the elastomer, the chemistry of the oil, and the temperature at which the exposure occurs, among other things. For example, the viscosity of the treatment fluid and contact temperature are important variables in determining the time required for the oil-swellable elastomer to swell.

According to the invention, an activator helps in accelerating the swelling of the elastomer. Preferably, the activator does not reduce the % change in weight over a period of time.

The newly developed formulations were evaluated for volume swelling at 93° C. (200° F.) and activators used in different formulations have potential to swell the elastomer up to 550% by volume which was observed using coupon testing.

The newly developed compositions were evaluated for weight increase at 66° C. (150° F.), 93° C. (200° F.), 121° C. (250° F.), and 150° C. (300° F.) using coupon testing, as described herein.

An example of an application of the invention is for accelerated swelling of an oil-swellable elastomer used in oil-swellable downhole tools such as swell screens while maintaining overall performance of the tool.

A method of swelling an oil-swellable elastomer in a well is provided, the method comprising the step of: contacting the oil-swellable elastomer in the well with a treatment fluid, wherein the treatment fluid comprises:

(A) an oil selected from the group consisting of alkanes and naphtha, wherein the oil comprises hydrocarbons having anywhere in the range of 5 to 21 carbons;

(B) an α-olefin having anywhere in the range of 18 to 26 carbons; and (C) an activator for oil-swelling, the activator selected from the group consisting of: ketones, dodecane, terpenes, terpenoids, haloalkanes having from 9 to 20 carbons, and any combination thereof.

A composition comprising an oil-swellable elastomer is provided, wherein the elastomer has absorbed therein:

(A) an oil selected from the group consisting of alkanes and naphtha, wherein the oil comprises hydrocarbons having anywhere in the range of 5 to 21 carbons;

(B) an α-olefin having anywhere in the range of 18 to 26 carbons; and (C) an activator for oil-swelling, the activator selected from the group consisting of: ketones, dodecane, terpenes, terpenoids, haloalkanes having from 9 to 20 carbons, and any combination thereof.

In addition, a well comprising an oil-swellable elastomer positioned in the well is provided, wherein the elastomer has absorbed therein:

(A) an oil selected from the group consisting of alkanes and naphtha, wherein the oil comprises hydrocarbons having anywhere in the range of 5 to 21 carbons;

(B) an α-olefin having anywhere in the range of 18 to 26 carbons; and (C) an activator for oil-swelling, the activator selected from the group consisting of: ketones, dodecane, terpenes, terpenoids, haloalkanes having from 9 to 20 carbons, and any combination thereof.

Oil-Swellable Elastomers

In broadest terms, there are essentially two main types of swellable elastomers used for downhole packers: oil-swellable or water-swellable.

Oil swellable elastomers work on the principle of absorption and diffusions. The swelling rate and volume increases are directly related to the composition and characteristics of the oil. The specific gravity of the oil plays an important role, but other qualities of the oil can also affect swelling behavior.

In contrast, water-swelling elastomers work on the principle of osmosis, a process that encourages the movement of water particles across a semi-permeable membrane, where there is a salinity difference on either side of the membrane.

Oil-swellable elastomers suitable for use in embodiments of the present invention can swell by at least 100% of their original volume when contacted by oil. As those of ordinary skill in the art, with the benefit of this disclosure, will appreciate, the actual swelling can depend on, for example, downhole pressure and downhole temperature, among other factors. Under downhole conditions, the swelling may be more, or less, depending on the conditions presented. For example, the swelling can be at least 200% at downhole conditions. In some embodiments, the swelling may be up to about 600% under downhole conditions.

Preferably, the elastomer is not degradable under downhole conditions.

Thousands of different compounds have been researched and developed so that the swelling characteristics can be matched to the specific well conditions.

Some specific examples of oil-swellable elastomers include, but are not limited to the group consisting of:
natural rubber,
acrylate butadiene rubber,
polyacrylate rubber,
isoprene rubber,
choloroprene rubber,
butyl rubber,
brominated butyl rubber,
chlorinated butyl rubber,
chlorinated polyethylene,
neoprene rubber,
styrene butadiene copolymer rubber,
styrene butadiene block copolymer rubber,
sulphonated polyethylene,
ethylene acrylate rubber,
epichlorohydrin ethylene oxide copolymer,
ethylene-propylene rubber,
ethylene-propylene-diene terpolymer rubber,
ethylene vinyl acetate copolymer,
fluorosilicone rubber,
silicone rubber,
poly 2,2,1-bicyclo heptene (polynorborneane),
alkylstyrene,
crosslinked vinyl acrylate copolymer,
crosslinked substituted vinyl acrylate copolymer,
and any combination thereof.

Preferably, the oil-swellable elastomer is selected from the group consisting of:
styrene-butadiene elastomer,
acrylonitrile-styrene-butadiene elastomer,
ethylene-propylene-diene elastomer,
and any combination thereof.

More preferably, the oil-swellable elastomer is selected from the group consisting of: ethylene propylene diene terpolymer or styrene butadiene copolymer.

Other swellable elastomers that behave in a similar fashion with respect to oil also may be suitable. Those of ordinary skill in the art, with the benefit of this disclosure, will be able to select an appropriate oil-swellable elastomer based on a variety of factors, including the application in which the elastomer will be used and the desired oil-swellable characteristics.

In general, diene-based polymers are presently the most preferred as oil-swellable polymers suitable for use according to the invention.

Of these many possibilities, three are most commonly-used as oil-swellable elastomers, namely ethylene propylene diene terpolymer, styrene butadiene copolymer, acrylonitrile butadiene styrene.

The oil-swellable elastomer used in the testing was a commonly-used oil-swellable elastomer used in Halliburton's PETROGUARD™ swell packer. FTIR for the elasomer did not observe C≡N bond, which ruled out acrylonitrile butadiene styrene (ABS). Based on the FTIR analysis, the oil-swellable elastomer is most likely of ethylene propylene diene terpolymer or styrene butadiene copolymer. Accordingly, these are presently the most preferred embodiments according to the invention.

Oils for Swelling of Oil-Swellable Elastomers

Examples of oils include, without limitation, kerosene, diesel, fuel oils, paraffin oils, mineral oils, low toxicity mineral oils, other petroleum distillates, crude oils, and combinations thereof Kerosene is a thin, clear liquid formed from hydrocarbons, with a density of 0.78-0.81 g/cm$^3$, is obtained from the fractional distillation of petroleum between 150° C. (300° F.) and 275° C. (527° F.) at atmospheric pressure, resulting in a mixture of carbon chains that typically contain 6 to 16 carbon atoms per molecule. Major constituents of kerosene include n-dodecane, alkyl benzenes and derivatives, and naphthalene and derivatives.

SURDYNE B-140™ is a commercial product of kerosene.

Diesel fuel in general is any liquid fuel used in diesel engines. The most common is a specific fractional distillate of petroleum fuel oil, but alternatives that are not derived from petroleum, such as biodiesel, biomass to liquid (BTL) or gas to liquid (GTL) diesel, are increasingly being developed and adopted. To distinguish these types, petroleum-derived diesel is increasingly called petrodiesel. Petroleum diesel, also called petrodiesel or fossil diesel, is produced from the fractional distillation of crude oil between 200° C. (392° F.) and 350° C. (662° F.) at atmospheric pressure, resulting in a mixture of carbon chains that typically contain between 8 and 21 carbon atoms per molecule.

PERCHEM 1150™ is a petroleum distillate similar to kerosene or diesel, and like these, it does not provide accelerated swelling. PERCHEM 1150™ is used as a control oil in the testing for rates of oil-swelling.

However, leaching of the oil-swellable elastomer is particularly observed when kerosene alone or diesel alone is used at high temperatures above about 65° C. (about 150° F.).

Hence, an additional component of α-olefins (C18 to C26) was incorporated and the blend was evaluated for swelling in the coupon testing having the composition shown in Table 1:

TABLE 1

| α-Olefins (essentially C20 to C24) | Approx. % by weight |
|---|---|
| 1-Octadecene (C18) | <0.1% |
| 1-Eicosene (C20) | 35-55% |
| 1-Docosene (C22) | 25-45% |
| 1-Tetracosene (C24) | 10-26% |
| 1-Hexacosene (C26) | 2% |
| Total | 100% |

A blend of SURDYNE B-140™ kerosene and α-olefins (C20 to C24) has the advantage of not producing any leaching, cracks, or other deterioration of the oil-swellable elastomer at temperatures tested up to 150° C. (300° F.). However, this blend alone does not provide accelerated swelling relative to the control of PERCHEM 1150™ petroleum distillate.

Activators for Accelerating Swelling

The swelling of elastomer with the oil can be further accelerated by adding suitable activating additives.

Preferably, the activator is selected from the group consisting of ketones, dodecane, terpenes, terpenoids, haloalkanes having from 9 to 20 carbons, and any combination thereof Examples of such activators include, for example, camphor (a cyclic ketone or terpenoid), methylisobutylketone (a non-cyclic ketone), dodecane, terpenes, terpenoids (e.g., PARAGON 1 E+™ terpenoids), and 1-bromohexadecane. These additives also help in enhancement of swelling the elastomer to more than 500% volume expansion in 72 to 94 hours.

Camphor is a waxy, white, or transparent solid with a strong, aromatic odor. It is a terpenoid with the chemical formula $C_{10}H_{16}O$. It is found in wood of the camphor laurel (Cinnamomum camphora), a large evergreen tree found in Asia (particularly in Sumatra, Borneo and Taiwan) and also of Dryobalanops aromatica, a giant of the Bornean forests. It also occurs in some other related trees in the laurel family, notably Ocotea usambarensis. Dried rosemary leaves (Rosmarinus officinalis), in the mint family, contain up to 20% camphor. It can also be synthetically produced from oil of turpentine. Camphor is also known as 1,7,7-Trimethylbicyclo[2.2.1]heptan-2-one.

PARAGON 1 E$^{+TM}$ is solvent of a terpenes and terpenoids, turpentine-oil limonene fraction. This commercial mixture of dipentene and other terpenes is commercially available from the Halliburton Company of Duncan, Okla., under the trade designation "PARAGON 1 E$^{+TM}$" and has the composition shown in Table 2:

TABLE 2

| Component | Approx. % by volume |
|---|---|
| Dipentene | 25 |
| α-pinene | 17 |
| 1,4-cineole | 16 |
| 1,8-cineole | 11 |
| Terpinolene | 10 |
| Camphene | 8 |
| α-terpinene | 7 |
| γ-terpinene | 5 |
| para-cymene | 1 |
| Total | 100 |

The presently most preferred activator comprises an activator selected from the group consisting of haloalkanes having 9 to 20 carbons. More preferably, the activator is a monohaloalkane having 9 to 20 carbons. Still more preferably, the activator is a 1-haloalkane having 9 to 20 carbons. Even more preferably, the activator is a 1-haloalkane having 14 to 18 carbons. Most preferably, the activator is or comprises 1-bromohexadecane.

Fluid Additives

A treatment fluid can contain additives that are commonly used in oil field applications, as known to those skilled in the art. These include, but are not necessarily limited to, surfactants, oxygen scavengers, alcohols, sulfide scavengers, bactericides, and combinations thereof. Of course, additives should be selected for not interfering with the purpose of the treatment fluid.

EXAMPLES

To facilitate a better understanding of the present invention, the following examples of certain aspects of some embodiments are given. In no way should the following examples be read to limit, or define, the entire scope of the invention.

Laboratory Testing Procedure

Step 1. Measure and record the initial weight of each test samples before starting the test. In general, each coupon was a roundel about 28 mm (diameter)×12 mm (thickness).

Step 2. Make sure that the laboratory balance used to carry out the weighing of samples is capable of measuring the weight to at least three decimal places.

Step 3. Initial weight of the test sample in air before exposing to the fluid is indicated as "$M_1$". It is important that the laboratory balance is zeroed before each weighing is made.

Step 4. Take 60 ml of the test fluid in the autoclave and insert above measured coupon in the cell. Pressurize the autoclave and keep in the oven at 200° F.

Step 5. After 24 hours, remove the autoclave from the oven, cool and then remove the test coupon from the test fluid. When the coupon is cool enough to handle, it was then wiped clean of excess test fluid by use of tissue paper.

Step 6. The sample is then weighed and the recorded measurement after time ($t_i$) in air is indicated as "$M_2$". It is important that the laboratory balance is zeroed before each weighing is made.

Step 7. The weight change of the test sample after time ($t_i$) is then calculated according to the following formula:

Change in weight (%)=[($M_2$-$M_1$)/($M_1$)]×100

Where:
$M_1$=initial mass of the sample in air (grams)
$M_2$=mass of sample after time ($t_i$) in air (grams)

Step 8. For weight change, measure and record the weight of each test sample.

Step 9. After doing measurements, the test coupon was again inserted in the composition and Steps 4 through 8 were repeated for another 7 days.

Similar test procedure was followed for each test fluid at respective temperatures.

FIGS. 1-4 show change in weight of elastomer at different temperatures 65° C. (150° F.) to 150° C. (300° F.) and the performance is evaluated against PERCHEM 1150™ petroleum distillate. All compositions show better performance in accelerating elastomer swelling in less than 5 days. Performance of few activators is overlapping at 200° F. and 250° F., however their performance is definitely better than PERCHEM 1150™ petroleum distillate. We have not included the results of base oils in all these figures. During other experiments, we have seen that SURDYNE B-140™ kerosene alone can acclerate swelling in initial 2-3 days relative to PERCHEM 1150™ petroleum distillate, however, with time rate of swelling decreases. The addition of αOlefin C20-C24 in the base oil composition along with SURDYNE B-140™ kerosone helps in sustaining the rate of swelling beyond three days. Thus, the mixture of α-Olefin C18-C26 and SURDYNE B-140™ kerosene as a base oil was selected and is necessary in achieving desired goal.

Figure 5:
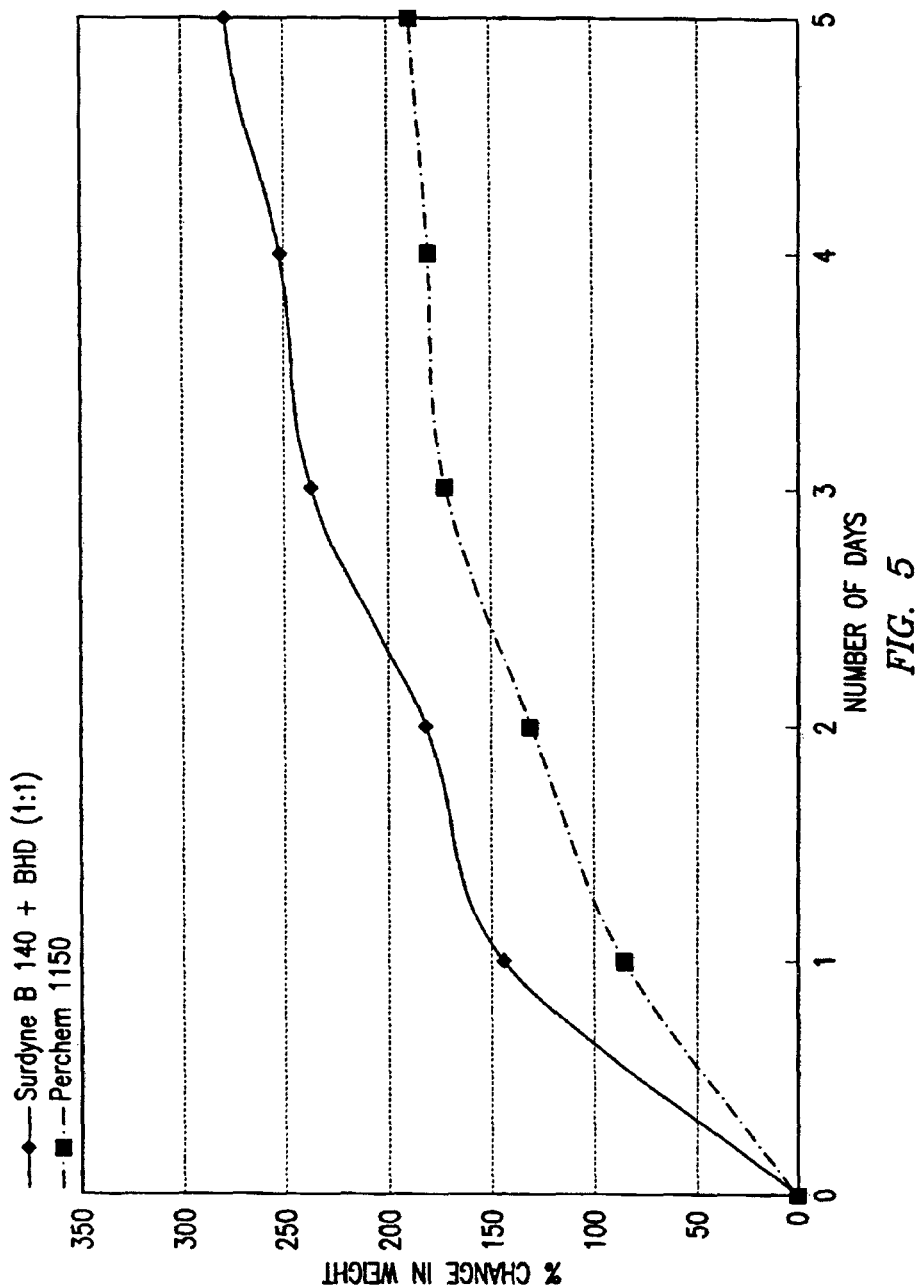
FIG. 5 is a graph showing the change in weight of elastomer over time at 200° F. using a blend of SURDYNE B-140™ kerosene and 1-bromohexadecane as activator compared to PERCHEM 1150™ petroleum distillate alone.
Figure 6:
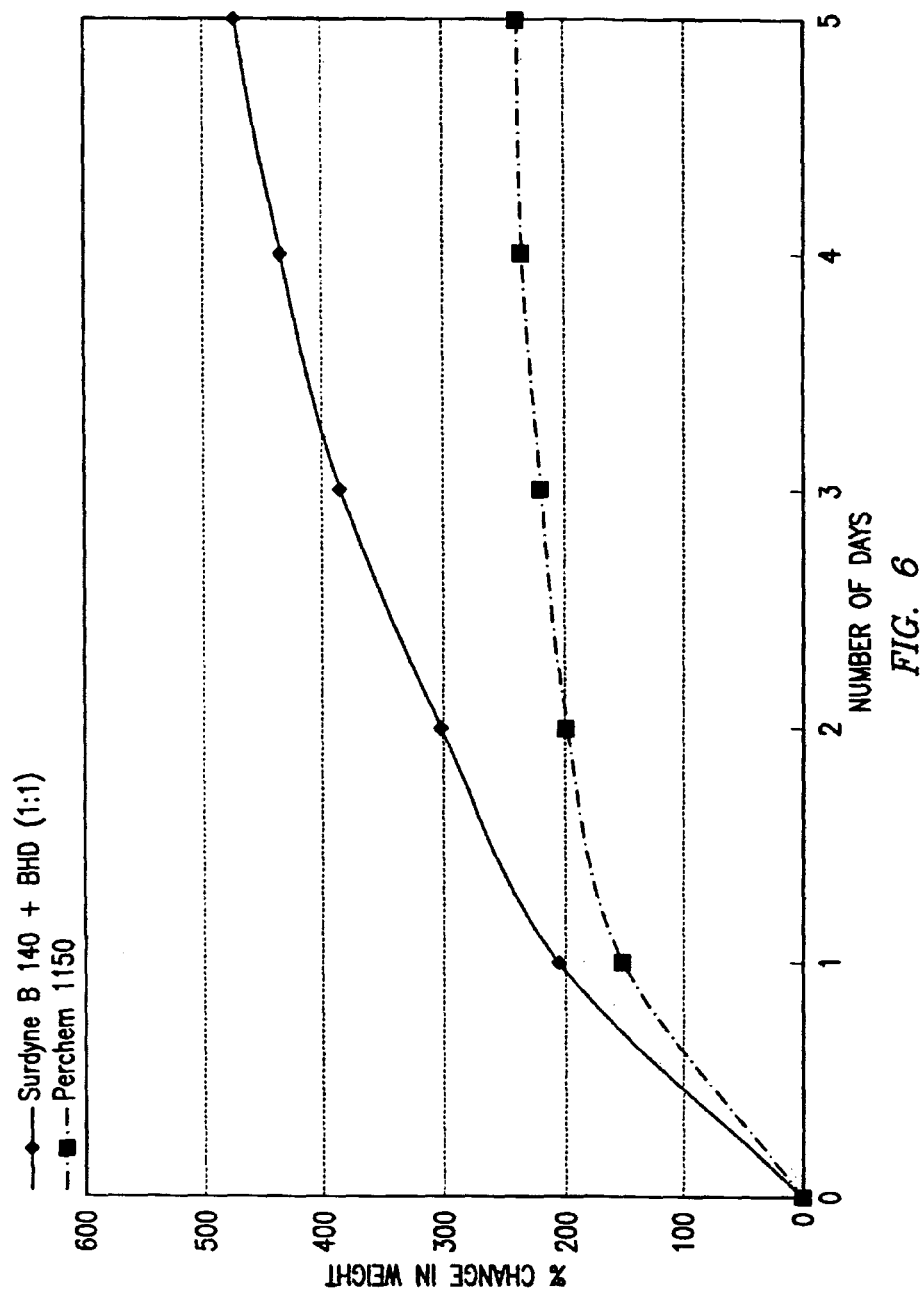
FIG. 6 is a graph showing the change in weight of elastomer over time at 250° F. using a blend of SURDYNE B-140™ kerosene and 1-bromohexadecane as activator compared to PERCHEM 1150™ petroleum distillate alone.
Figure 7:
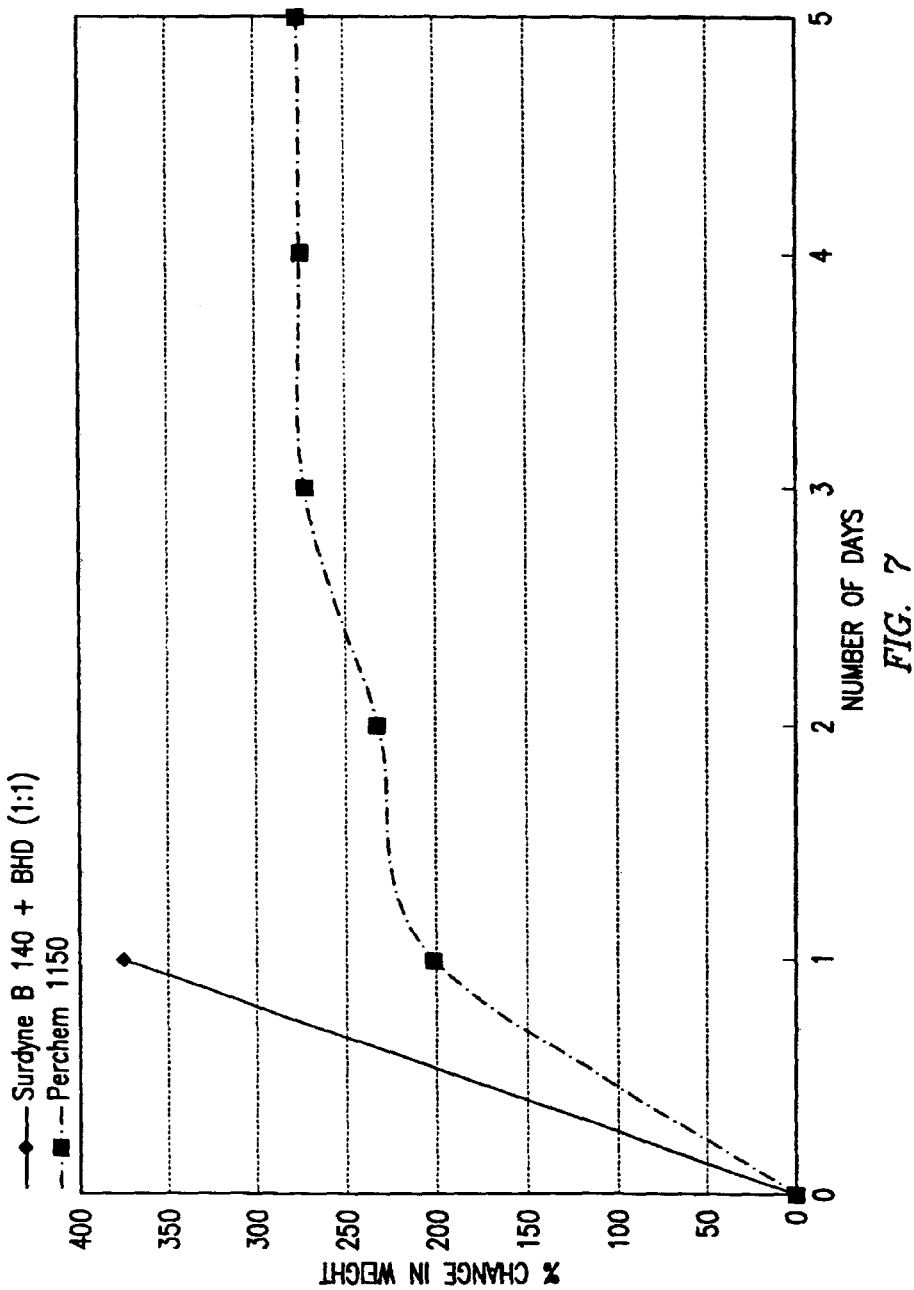
FIG. 7 is a graph showing the change in weight of elastomer over time at 300° F. using a blend of SURDYNE B-140™ kerosene and 1-bromohexadecane as activator compared to PERCHEM 1150™ petroleum distillate alone.

However, when we use BHD as an activator in presence of αOlefin C18-C26 and SURDYNE B-140™ kerosene we observed very high rate of swelling within 24 hrs (375% at 300° F.). Hence, in order to get accelerated swelling in a controlled manner within 1-5 days we tried experiments by removing one of the oil component, that is, α-Olefin C18-C26. Experiments with SURDYNE B-140™ kerosene and BHD could provide controlled accelerated swelling at various temperatures and results for the same are documented in FIGS. 5-7.

Figure 8:
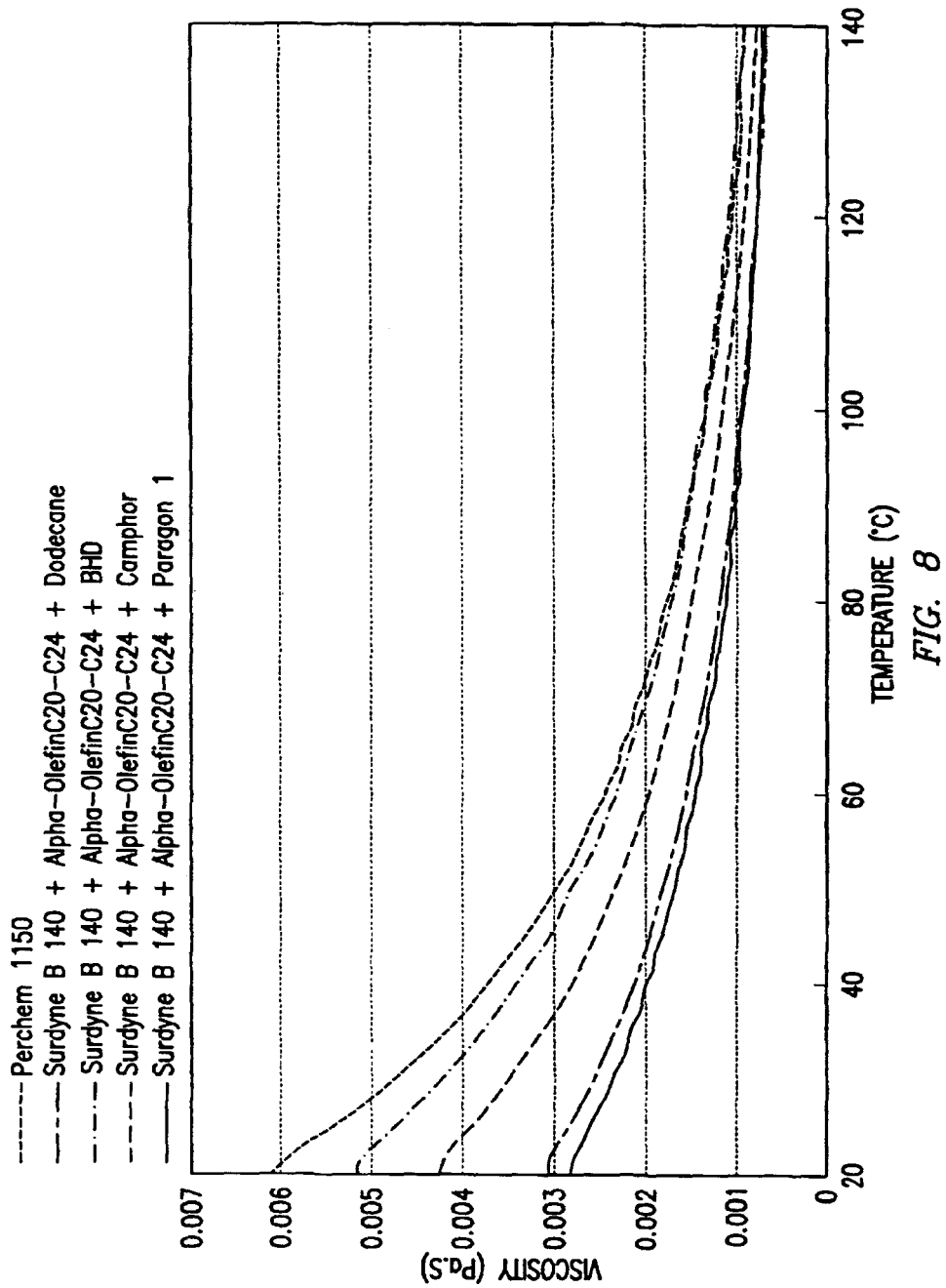
FIG. 8 is a graph showing the apparent viscosity of the various tested formulations as a function of temperature.

Swelling of elastomer depends on the viscosity of fluid. Low viscous fluids has faster rate of penetration in the elastomer than highly viscous liquids. Hence, it is preferable to have a lower viscosity for the fluids under study. FIG. 8 shows viscosity of all compositions as a function of temperature and compared against PERCHEM 1150™ petroleum distillate. PERCHEM 1150™ petroleum distillate has higher viscosity while newly developed formulations fall below PERCHEM 1150™ petroleum distillate. Due to this low viscosity we observed acceleration in elastomer swelling particularly in initial five days.

An oil formulation comprising (A) an oil selected from the group consisting of alkanes and naphtha, wherein the oil comprises hydrocarbons having anywhere in the range of 5 to 21 carbons, and (B) an α-olefin having anywhere in the range of 18 to 26 carbons, can deliver around 500% volume expansion in about 72 to about 94 hours (about 3 to about 4 days) while diesel provides only around 400% volume expansion within about 72 hours.

The swelling of elastomer in the oil can be further accelerated by adding suitable activating additives such as camphor, dodecane, methylisobutylketone, paragon, and 1-bromohexadecane. These additives also help in enhancement of swelling the elastomer to more than 500% volume expansion in about 72 to about 94 hours.

Activator 1-bromohexadecane ("BHD") provides the best swelling in presence of SURDYNE B-140™ kerosene alone or SURDYNE B-140™ kerosene with a-Olefins (C18 to C26), particularly in less than five days.

No generation of voids or cracks on the surface of the elastomer is observed even after exposing the coupon to the oil-based formulations for seven days under temperature and pressure.

Using different activators, it is possible to tailor different compositions to swell the elastomer volume expansion by about 300% to about 500%, as per the design requirement within 72 to 94 hours.

The basic composition contains neither water nor any water-including fluids such as emulsions. Hence the possibility of damage to the formation is greatly reduced.

Preferably, the basic composition contains a minimum amount of short-chain hydrocarbons having fewer than 6 carbons.

The previously used fluid systems are capable of swelling the PETROGUARD™ swell screens in up to 55 days. The newly-developed formulations can accelerate the elastomer swelling to within about 3 to about 5 days and hence will be able to save rig time and costs.

Other Considerations

The treatment fluid can be mixed both at off-site and on-site

No special mixing equipment is required.

The fluid can be being transported at ambient temperature and pressure. For extreme conditions please refer to individual fluid MSDS.

The viscosity of the treatment fluid varies from about 2 mPa·s (2 cP) to about 5 mPa·s (5 cP) depending on the composition. The rheology is not supposed to be affected with normal mixing equipment. The properties were tested for 15 days for laboratory evaluation without any degradation. It is expected to retain the properties for much longer period.

All the compositions are environmental friendly.

No specific pre-job modeling is required.

The fluid is a Newtonian fluid and has similar characteristics such as diesel.

No specific property is reported to affect pumps or mud motors.

No vibration or lubricity concerns or considerations relating to the fluid or equipment being used with the fluid.

No turbulent or laminar flow characteristics that will affect the drill pipe (e.g., erosion of the drill pipe), drill bit, MWD/LWD, and any other associated equipment.

No special types of equipment that have special application with this unique fluid.

Fluid is homogenous and not expected to be separated.

Fluid is expected to stay permanently inside the elastomer during the well life. No return of the absorbed fluid is expected.

Hole cleaning not required.

Method of Treating a Well with the Treatment Fluid

According to another embodiment of the invention, a method of treating a well, is provided, the method including the steps of: forming a treatment fluid according to the invention; and introducing the treatment fluid into the well.

A treatment fluid can be prepared at the job site, prepared at a plant or facility prior to use, or certain components of the treatment fluid can be pre-mixed prior to use and then transported to the job site.

In certain embodiments, the preparation of a treatment fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a treatment fluid into a well is within a relatively short period after forming the treatment fluid, e.g., less within 30 minutes to one hour. More preferably, the step of delivering the treatment fluid is immediately after the step of forming the treatment fluid, which is "on the fly."

It should be understood that the step of delivering a treatment fluid into a well can advantageously include the use of one or more fluid pumps.

Preferably, the step of introducing is at a rate and pressure below the fracture pressure of the treatment zone.

Preferably, the methods further comprise the step of: placing the oil-swellable elastomer in the well. For example, the elastomer can be in the form of a particulate. More preferably, the oil-swellable elastomer is formed and positioned as a sheath over a portion of a tubular. Preferably, the oil-swellable elastomer swells to seal an annulus between the tubular and a borehole of the well. In a preferred embodiment, a bonded mesh filtration media is included with the portion of the tubular.

Preferably, a subterranean formation adjacent the portion of the tubular produces sand, whereby the methods provide sand control.

Preferably, the step of contacting is with at least a sufficient amount of the treatment fluid to fill an annulus between the portion of the tubular and a borehole of the well.

Preferably, the step of contacting is with at least a sufficient amount of the treatment fluid to swell the oil-swellable elastomer at least 300% by weight. More preferably, the step of contacting is with at least a sufficient amount of the treatment fluid to swell the oil-swellable elastomer at least 400% by weight. Most preferably, the step of contacting is with at least a sufficient amount of the treatment fluid to swell the oil-swellable elastomer at least 500% by weight.

Preferably, the step of contacting further comprises: a design temperature anywhere in the range of 100° F. to 400° F. More preferably, the step of contacting further comprises: a design temperature anywhere in the range of 150° F. to 300° F.

Preferably, the step of contacting further comprises: contacting for at least 72 hours. More preferably, the step of contacting further comprises: contacting for at least 96 hours. Most preferably, the step of contacting further comprises: contacting for at least 120 hours.

Preferably, the step of contacting further comprises: contacting for less than 50 days. More preferably, the step of contacting further comprises: contacting for less than 21 days. More preferably, the step of contacting further comprises: contacting for less than 14 days. Still more preferably, the step of contacting further comprises: contacting for less than 7 days. Most preferably, the step of contacting further comprises: contacting for less than 5 days.

Any of the methods can further comprise, after the step of contacting, flowing a different fluid from the well.

Any of the methods can further comprise, after the step of contacting, injecting a different treatment fluid into the well.

Preferably, after any such method according to the invention, a step of producing hydrocarbon from the subterranean formation is the desirable objective.

CONCLUSION

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of swelling an oil-swellable elastomer in a well, the well comprising a borehole and a tubular, the method comprising the steps of:
    placing an oil-swellable elastomer in an annulus, the annulus located between a portion of the borehole and a portion of the tubular;
    after placing the oil-swellable elastomer in the annulus, introducing a treatment fluid into the well; and
    contacting the oil-swellable elastomer in the annulus with the treatment fluid for at least 72 hours with at least a sufficient amount of the treatment fluid to fill the annulus or to swell the oil-swellable elastomer at least 300% by weight;
    wherein contacting the oil-swellable elastomer with the treatment fluid swells the oil-swellable elastomer over at least a portion of the tubular and creates a seal between the portion of tubular and the borehole;
    wherein the treatment fluid comprises:
    (A) an oil selected from alkanes and naphtha, wherein the oil comprises hydrocarbons having from 5 to 21 carbons;
    (B) an α-olefin having from 18 to 26 carbons; and
    (C) an activator for oil-swelling, the activator selected from: ketones, dodecane, terpenes, terpenoids, haloalkanes having from 9 to 20 carbons, and any combination thereof; and
    wherein the treatment fluid is substantially free of the oil-swellable elastomer.

2. The method according to claim 1 further comprising, after the step of contacting, flowing a different fluid from the well or injecting a different treatment fluid into the well.

3. The method according to claim 1, wherein the step of contacting further comprises a design temperature anywhere in the range of from 100° F. to 400° F.

4. The method according to claim 1, wherein the step of contacting further comprises contacting for less than 50 days.

5. The method according to claim 1, wherein the oil-swellable elastomer is selected from:
    natural rubber,
    acrylate butadiene rubber,
    polyacrylate rubber,
    isoprene rubber,
    choloroprene rubber,
    butyl rubber,
    brominated butyl rubber,
    chlorinated butyl rubber,
    chlorinated polyethylene rubber,
    neoprene rubber,
    styrene butadiene copolymer rubber, styrene butadiene block copolymer rubber,
    sulphonated polyethylene,
    ethylene acrylate rubber,
    epichlorohydrin ethylene oxide copolymer,
    ethylene-propylene copolymer rubber,
    ethylene-propylene-diene terpolymer rubber,
    ethylene vinyl acetate copolymer,
    fluorosilicone rubber,
    silicone rubber,
    poly 2,2,1-bicyclo heptene (polynorborneane),
    alkylstyrene,
    crosslinked vinyl acrylate copolymer,
    crosslinked substituted vinyl acrylate copolymer,
    and any combination thereof.

6. The method according to claim 1, wherein the activator is selected from camphor, methylisobutylketone, dodecane, terpenes, terpenoids, 1- bromohexadecane, and any combination thereof.

7. The method according to claim 1, wherein the activator is selected from a haloalkane having from 9 to 20 carbons, a monohaloalkane having from 9 to 20 carbons, a 1-haloalkane having from 9 to 20 carbons, a 1-haloalkane having from 14 to 18 carbons, or 1- bromohexadecane.

8. The method according to claim 1, wherein the treatment fluid is nonaqueous and has a viscosity of less than 10 mPa·s (10 cP).

9. An apparatus comprising:
    a borehole;
    a tubular;
    an annulus located between a portion of the borehole and a portion of the tubular;
    a mesh filtration media placed in the annulus; and
    an oil-swellable elastomer placed in the annulus, wherein the elastomer has absorbed therein:
    (A) an oil selected from alkanes and naphtha, wherein the oil comprises hydrocarbons having from 5 to 21 carbons;
    (B) an α-olefin having from 18 to 26 carbons; and
    (C) an activator for oil-swelling, the activator selected from:
    ketones, dodecane, terpenes, terpenoids, haloalkanes having from 9 to 20 carbons, and any combination thereof; and
    wherein the elastomer has formed a sheath over the mesh filtration media and the elastomer and mesh filtration media are configured for use as a swell screen for sand control.

10. The apparatus according to claim 9, wherein the oil-swellable elastomer is selected from:
    natural rubber,
    acrylate butadiene rubber,
    polyacrylate rubber,
    isoprene rubber,
    choloroprene rubber,
    butyl rubber,
    brominated butyl rubber,
    chlorinated butyl rubber,
    chlorinated polyethylene, neoprene rubber,
styrene butadiene copolymer rubber,
styrene butadiene block copolymer rubber,
sulphonated polyethylene,
ethylene acrylate rubber,
ethylene-propylene rubber,
ethylene-propylene-diene terpolymer rubber,
ethylene vinyl acetate copolymer,
fluorosilicone rubber,
silicone rubber,
poly 2,2,1-bicyclo heptene (polynorbomeane),
alkylstyrene,
crosslinked vinyl acrylate copolymer,
crosslinked substituted vinyl acrylate copolymer,
and any combination thereof.

11. The well apparatus according to claim 9, wherein the activator is selected from camphor, methylisobutylketone, dodecane, terpenes, terpenoids, 1- bromohexadecane, and any combination thereof.

12. The apparatus according to claim 9, wherein the activator is selected from a haloalkane having from 9 to 20 carbons, a monohaloalkane having from 9 to 20 carbons, a 1- haloalkane having from 9 to 20 carbons, a 1-haloalkane having from 14 to 18 carbons, and 1- bromohexadecane.

13. A method of swelling an oil-swellable elastomer in a well, the method comprising the steps of:
  placing an oil-swellable elastomer and a mesh filtration media in the well;
  after placing the oil-swellable elastomer, introducing a treatment fluid into the well;
  contacting the oil-swellable elastomer with the treatment fluid to swell to the oil-swellable elastomer over or within a portion of the mesh filtration media;
  wherein the treatment fluid comprises:
    (A) an oil selected from alkanes and naphtha, wherein the oil comprises hydrocarbons having from 5 to 21 carbons;
    (B) an $\alpha$-olefin having from 18 to 26 carbons; and
    (C) an activator for oil-swelling, the activator selected from: ketones, dodecane, terpenes, terpenoids, haloalkanes having from 9 to 20 carbons, and any combination thereof;
  wherein the treatment fluid is substantially free of the oil-swellable elastomer; and
  wherein after the step of contacting the elastomer and mesh filtration media are operable for use as a swell screen for sand control.

* * * * *

UNITED STATES PATENT AND TRADEMARK OFFICE
CERTIFICATE OF CORRECTION

PATENT NO. : 10,100,244 B2
APPLICATION NO. : 14/771065
DATED : October 16, 2018
INVENTOR(S) : Patil et al.

It is certified that error appears in the above-identified patent and that said Letters Patent is hereby corrected as shown below:

In the Claims

Claim 10, Column 19, after Line 5 ("ethylene acrylate rubber"), insert -- [new paragraph] epichlorohydrin ethylene oxide copolymer, --;

Claim 11, Column 19, Line 16, after "The" delete "well".

Signed and Sealed this
Eighteenth Day of December, 2018

Andrei Iancu
*Director of the United States Patent and Trademark Office*